(12) United States Patent
Smith et al.

(10) Patent No.: US 7,211,778 B1
(45) Date of Patent: May 1, 2007

(54) NIGHT VISION GOGGLE WITH SEPARATE CAMERA AND USER OUTPUT PATHS

(75) Inventors: William A. Smith, Daleville, VA (US);
Albert Efkeman, Roanoke, VA (US);
Steven Brillhart, Vinton, VA (US);
Donald J. Janeczko, Fincastle, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/245,934

(22) Filed: Oct. 7, 2005

(51) Int. Cl.
*H01J 43/04* (2006.01)
*H01J 21/20* (2006.01)

(52) U.S. Cl. .............. 250/207; 250/214 VT; 250/330; 359/629; 359/630

(58) Field of Classification Search .......... 250/207, 250/214 VT, 330, 338.1; 348/217.1; 313/523, 313/524; 359/618, 629, 630
See application file for complete search history.

(56) References Cited

U.S. PATENT DOCUMENTS

| | | | |
|---|---|---|---|
| 5,035,472 A | | 7/1991 | Hansen |
| 5,729,010 A | * | 3/1998 | Pinkus et al. ......... 250/214 VT |
| 6,069,352 A | * | 5/2000 | Castracane et al. ... 250/214 VT |
| 6,195,206 B1 | * | 2/2001 | Yona et al. .................. 359/630 |
| 6,411,435 B1 | * | 6/2002 | Hall ............................ 359/435 |
| 6,560,029 B1 | | 5/2003 | Dobbie et al. |
| 6,639,706 B2 | * | 10/2003 | Ziv et al. ..................... 359/238 |
| 6,762,884 B2 | | 7/2004 | Beystrum et al. |
| 6,791,760 B2 | | 9/2004 | Janeczko et al. |
| 6,798,578 B1 | * | 9/2004 | Beystrum et al. ........... 359/630 |
| 7,053,928 B1 | * | 5/2006 | Connors et al. ............ 348/164 |
| 2002/0030163 A1 | | 3/2002 | Zhang |
| 2006/0221180 A1 | * | 10/2006 | Ostromek et al. ............ 348/53 |

FOREIGN PATENT DOCUMENTS

| | | |
|---|---|---|
| WO | WO 85/00433 | 1/1985 |
| WO | WO 02/059654 A2 | 8/2002 |
| WO | WO 03/104877 A1 | 12/2003 |

OTHER PUBLICATIONS

International Search Report - Appln. No. PCT/US2006/039255 Filed Jun. 10, 2006.

* cited by examiner

*Primary Examiner*—Stephone B. Allen
*Assistant Examiner*—Davienne Monbleau
(74) *Attorney, Agent, or Firm*—RatnerPrestia

(57) ABSTRACT

A night vision device comprising a first detector, a beam splitter, a user optical output and a camera. The first detector is configured to detect and transmit a scene image in a first spectral band along a first optical path. The beam splitter is configured to receive the first optical path image; to output, along a second optical path, a first portion of the first optical path image, and to output, along a third optical path, a second portion of the first optical path image. The user optical output is configured to receive and output images traveling along the second optical path. The camera is configured to receive and store images traveling along the third optical path.

15 Claims, 4 Drawing Sheets

NIGHT VISION GOGGLE WITH SEPARATE CAMERA AND USER OUTPUT PATHS

BACKGROUND OF THE INVENTION

This invention relates generally to night vision devices, and more particularly, to a night vision device including a camera to record the images produced by the night vision device.

Night vision devices are commonly used by military personnel for conducting operations in low light or night conditions. The night vision devices utilized by the military typically include image intensifier tubes and associated optics that convert visible and near infrared light into viewable images. Conventional night vision goggles (NVG) have been in widespread use for several decades. All variants of the currently fielded hardware are based on a common optical architecture. This architecture consists of an objective lens, an image intensifier tube, and an eyepiece lens. Functionally, the objective lens focuses an image of a low light level scene onto the image intensifier tube. The intensifier tube amplifies this faint image and presents an amplified image on its output surface. The eyepiece lens allows a human eye to view the amplified image.

To enhance night vision devices, enhanced night vision goggles (ENVG) have been developed. See for example U.S. Pat. Nos. 5,035,472; 6,560,029; 6,762,884; and 6,791,760, each of which is incorporated herein by reference. These ENVG's incorporate thermal imaging cameras or detectors to detect infrared radiation. Thermal imaging cameras are responsive to different portions of the infrared spectrum and are often referred to as infrared cameras, thus providing additional information to the viewer. The images from the image intensifier tube and from the infrared camera are combined to provide an enhanced image to the user.

SUMMARY OF THE INVENTION

The present invention provides a night vision device generally comprising a first detector, a beam splitter, a user optical output and a camera. The first detector detects and transmits a scene image in a first spectral band along a first optical path. The beam splitter is configured to receive images traveling along the first optical path; to output, along a second optical path, a first portion of the images traveling along the first optical path; and output, along a third optical path, a second portion of the images traveling along the first optical path. The user optical output is configured to receive and output images traveling along the second optical path. The camera is configured to receive and store images traveling along the third optical path.

The present invention also provides a night vision device comprising a housing, a first optical receiver located within the housing, wherein the first optical receiver transmits a first optical signal, and a second optical receiver located within the housing, wherein the second optical receiver transmits a second optical signal. A signal combiner is located within the housing, wherein the signal combiner combines the first optical signal and the second optical signal to form a first combined optical signal and a second combined optical signal. An optical display is optically aligned with the first combined optical signal to display the first combined optical signal to a user. A camera is optically aligned with the second combined optical signal, such that the camera records at least the first optical signal.

Further, the present invention provides a method of observing and recording an image through a night vision goggle comprising the steps of transmitting an image intensification generated optical image to a beam splitter; transmitting an infrared generated optical image to the beam splitter; splitting the image intensification generated optical image at the beam splitter and transmitting a first percentage of the image intensification generated optical image to a lens for viewing and transmitting a remaining percentage of the image intensification generated optical image to a camera for recording; and splitting the infrared generated optical image at the beam splitter and transmitting a first percentage of the infrared generated optical image to a lens for viewing and transmitting a remaining percentage of the infrared generated optical image to a camera for recording.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
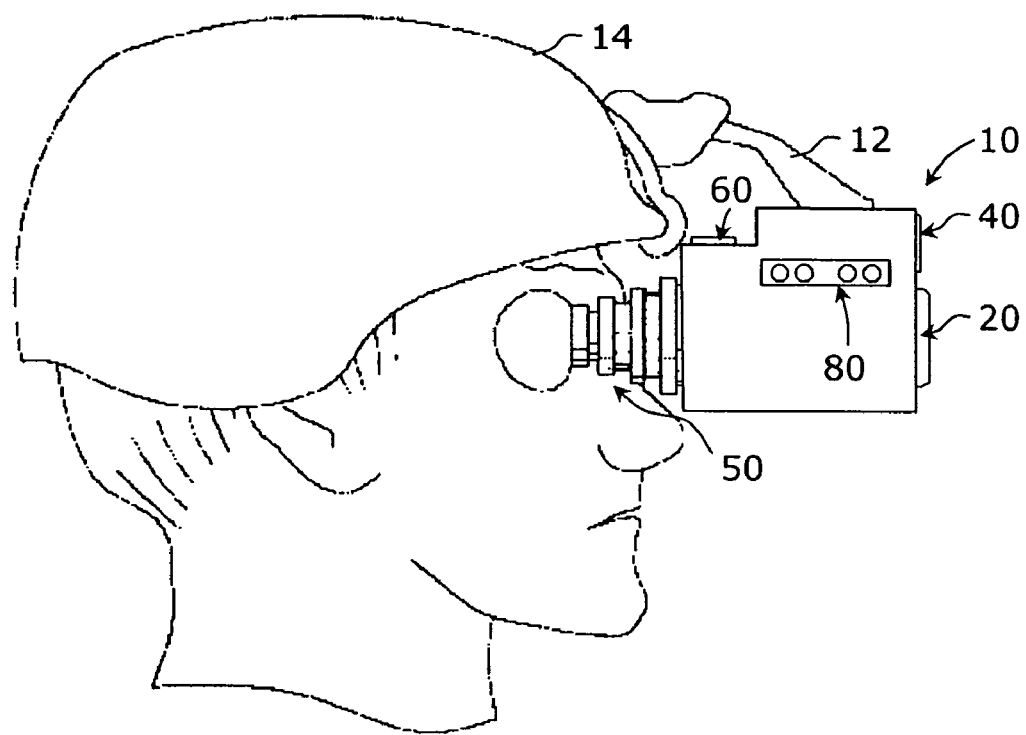
FIG. 1 shows an embodiment of the night vision goggle of the invention as worn by a user.
Figure 2:
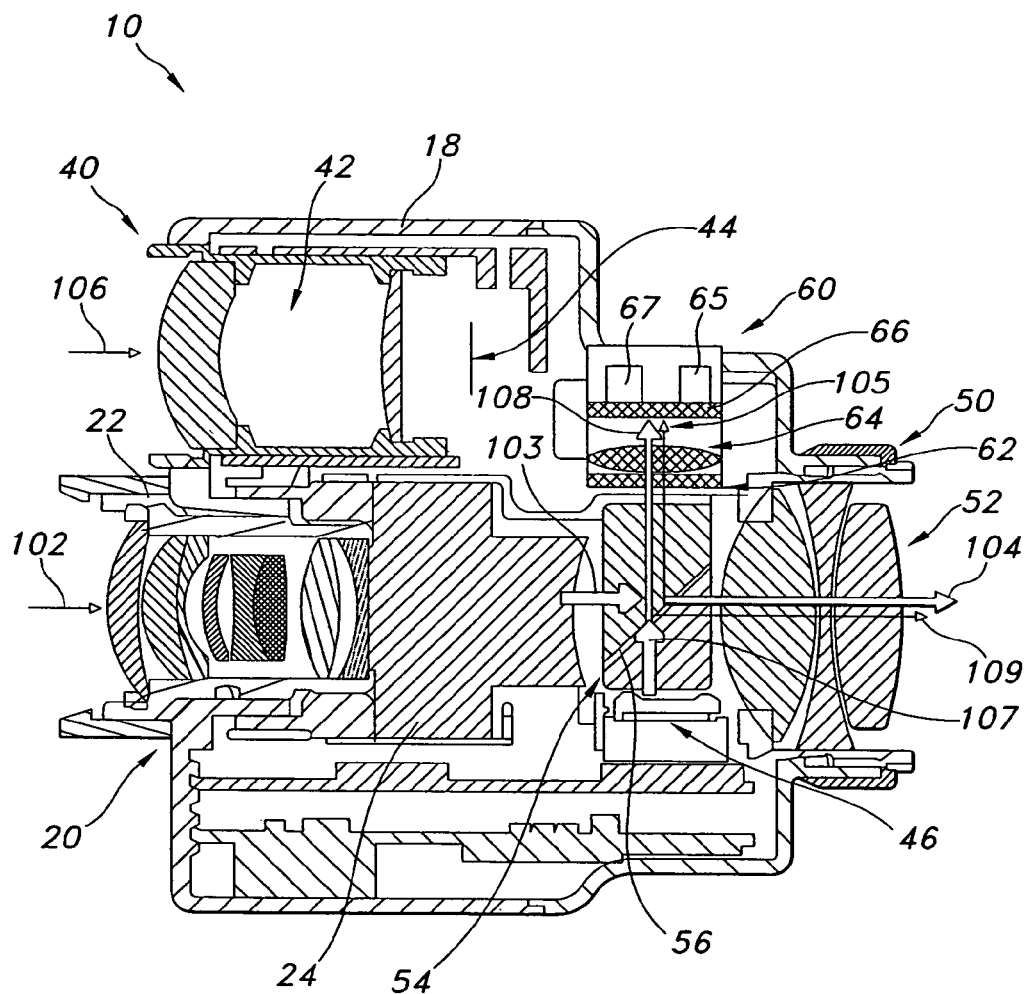
FIG. 2 is a cross-sectional view of the night vision goggle of FIG. 1.

Referring to FIGS. 1–4, a night vision goggle 10 that is a first embodiment of the present invention is shown. The night vision goggle 10 may be monocular or binocular. As shown in FIG. 1, the night vision goggle 10 may be mounted on a helmet 14 via a support bracket 12. While the present invention is described as mounted to a helmet, the invention is not limited to such. The night vision goggle 10 may be used in various other applications. For example, the night vision goggle 10 may be a handheld device, mounted to a head harness or on a weapon, or supported by a strap assembly independent of the helmet.

The night vision goggle 10 generally includes an image intensifier 20, a second channel sensor, such as an infrared camera 40, a user output 50 and a camera assembly 60. These devices are retained within a housing 18. While a single housing 18 is shown, one or more of the components may be provided as stand alone components that are attached to or otherwise associated with the housing 18. The camera assembly 60 may be a stand-alone camera that can be attached as needed and stored when unnecessary, thereby reducing weight of the system. A plug or cover (not shown) can be positioned over the camera assembly's port when not in use.

The image intensifier 20 includes an objective lens assembly 22 configured to focus visible and near infrared light from a sensed image 102 onto an image intensifier tube 24.

The image intensifier tube 24 is preferably a known I² tube, which generally includes a photo-cathode that converts the light photons to electrons, a multi-channel plate that accelerates the electrons and a phosphor screen that receives the accelerated electrons and creates a luminance in response to the accelerated electrons. The image created by image intensifier 20 is directed along an image intensified input path, as indicated by arrow 103, to a beam splitter 54. The beam splitter 54 may combine and/or split received beams, as will be described in more detail hereinafter, but is referred to herein as a beam splitter. The user display optics 52 are substantially co-axial with the image intensifier 20 and the beam splitter 54, but instead may be offset with a non-linear optics path defined therebetween. Image intensifier 20 is preferably a late model version such as referred to in the art as Generation III, or a later model when such becomes available. If desired, an earlier model, such as a Generation II, may be used.

While the second channel sensor may be any suitable sensor, for purposes of the present disclosure, the second channel sensor will be described as the infrared camera 40. The infrared camera 40 is used to convert infrared imagery into a visible image. The infrared camera 40 may be based on an uncooled focal plane array (FPA) and incorporates its own objective lens 42, which is designed to provide a thermal video field of view that is essentially the same as the field of view of the image intensifier 20. The optical axes of infrared camera 40 and image intensifier 20 are aligned generally parallel to each other during assembly of the night vision goggle 10. The objective lens 42 focuses the infrared image 106 on to the thermal sensor 44, which outputs a signal indicative of the image. A system electronics 100 receives the output signal from the thermal sensor 44 and projects the image onto a display 46. The display 46 is configured to provide an infrared image along a camera output path 107 to the beam splitter 54 at a substantially right angle relative to the path of the image intensifier image 103.

The display 46 can have various configurations, for example, an emissive type, reflective type, or transmissive type. An emissive type is preferred for the present application since it offers the smallest package and consumes the least power, although reflective and transmissive type displays are encompassed herein. Emissive displays include electroluminescent displays, vacuum fluorescent displays, field emissive displays and OLEDS (organic LED's). As the name implies, the emissive source emits light and does not require a separate light source.

The beam splitter 54 includes a dichroic surface 56 that is configured to control passage of the image intensifier image 103 and the infrared camera video image along the camera output path 107 through the beam splitter 54. The dichroic surface 56 allows a predetermined percentage of light incident thereon to pass through while reflecting the remainder of the light. For example, the dichroic surface 56 may be configured to allow approximately 70–90 percent of the light incident thereon to pass through while the remaining 10–30 percent is reflected. The percentage of pass through may be varied and is not limited to the indicated range.

In the present embodiment of the invention, the dichroic surface 56 is configured to allow a percentage of the light incident thereon to pass through. By way of example only, 85 percent of the incident thereon may pass through. As such, approximately 85 percent of the image intensifier image 103 passes through the beam splitter 54 toward the user display optics 52, along a visual lens output path, as indicated by arrow 104, while a remaining percentage, in this case, approximately 15 percent, is reflected. With the dichroic surface 56 at an approximately 45 degree angle, the reflected portion of the image 105 is directed upward in the figures, parallel to the path of the camera output path 107. Similarly, a percentage of the video display image along the camera output path 107 passes through the dichroic surface 56, as indicated by arrow 108, and combines and travels with the intensifier image reflected portion 105. Again, by way of example only, this percentage may be 85 percent of the video display image. The remaining percentage, in this case, approximately 15 percent, of the video display image along the camera output path 107 reflects off the dichroic surface 56, as indicated by the arrow 109, and combines with the passed through portion 104 of the intensifier image. Mathematically speaking, the percentage of light incident on the dichroic surface 56 that passes through the dichroic surface 56 may be "x" percent, while a remaining percentage, "(100-x)" percent, is reflected. The percentage of the video display image along the camera output path 107 that passes through the dichroic surface 56 is also "x" percent, while a remaining percentage, "(100-x)" percent, is reflected.

The combined images 104 and 109 are directed along a visual lens output path toward the user display optics 52. The user display optics 52 provide the user with the ability to focus on the beam splitter 54 such that the combined image is provided to the user's eye.

Figure 3:
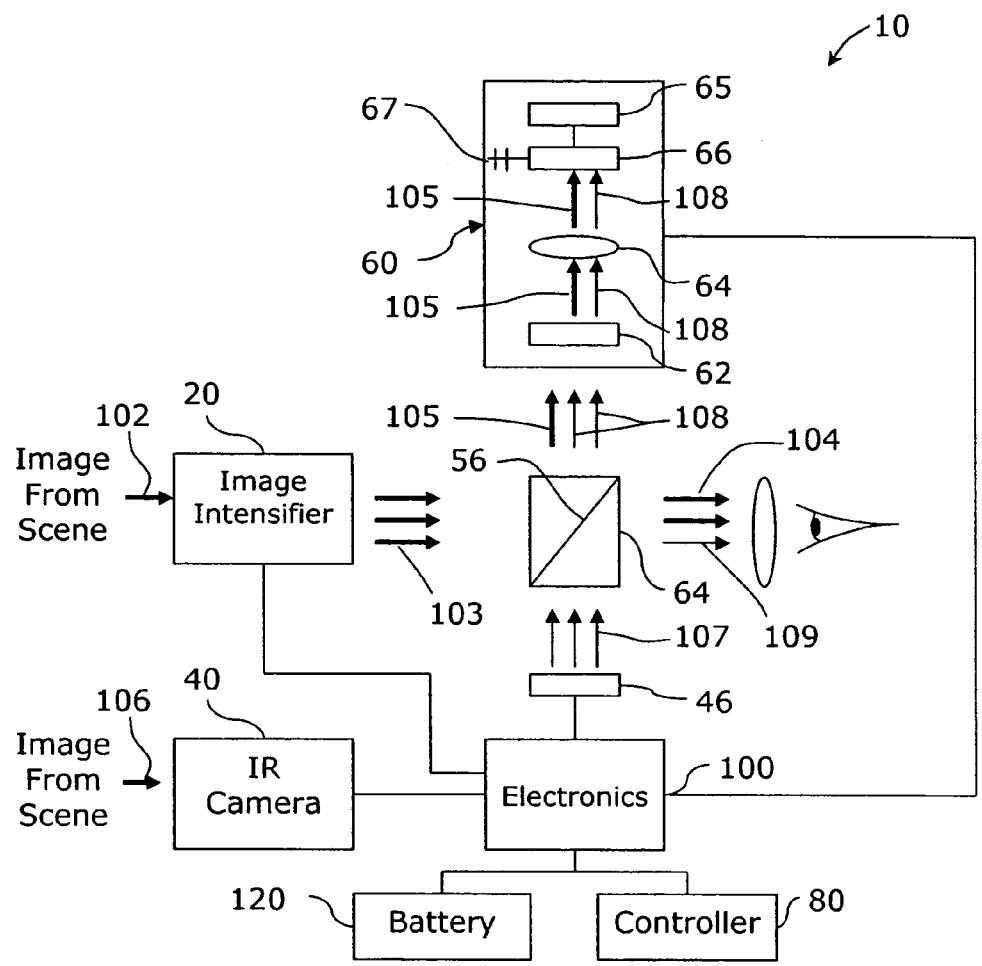
FIG. 3 is a block diagram of the night vision goggle of FIG. 1 with a filter configured to provide only images from an image intensifier to a modular camera assembly.
Figure 4:
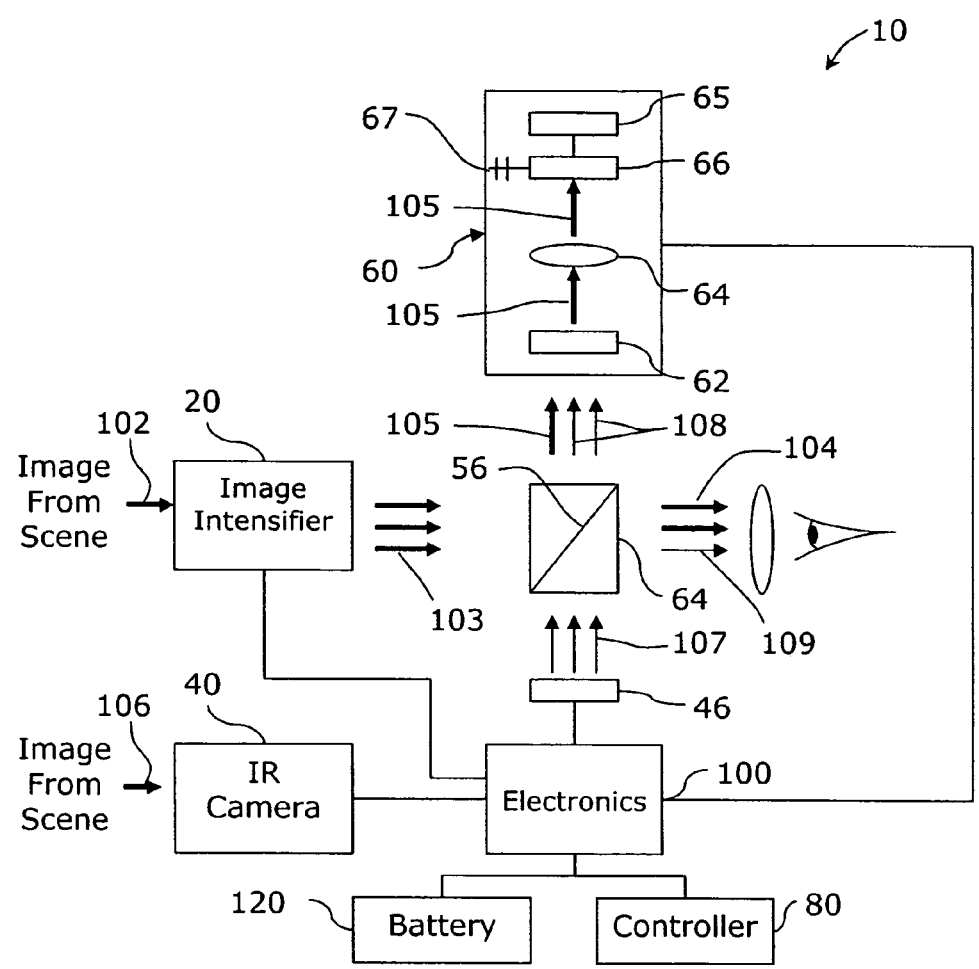
FIG. 4 is a block diagram of the night vision goggle of FIG. 1 with a filter configured to provide images from an image intensifier and a second channel display to a modular camera assembly.

The reflected portion 105 of the intensifier image and the passed through portion 108 of the video display image travel along a camera output path toward the camera assembly 60. The camera assembly 60 generally comprises a filter 62, a relay lens 64, and a recording camera 66. The recording camera 66 senses all or part of the image portions 105 and 108, depending on the filter 62, and creates still images or a video signal that contains a rendition of the sensed image portions 105 and 108. To capture both the image portions 105 and 108 with a balance equivalent to that observed through the display optics 52, the filter 62 may be an absorbing filter that reduces, but does not eliminate, the sensed image portion 108, such that the combined image is provided to recording camera 66. This filter configuration is shown in FIG. 3. To capture only the intensifier image portion 105, the filter 62 may be a band pass filter to eliminate the video display image portion 108, thereby only passing the intensifier image portion 105 to the recording camera 66, as shown in FIG. 4. The system controller 80 may be configured to allow the user to adjust the filter 62 to select the image configuration delivered to the recording camera 66.

The recording camera 66 may be of the CMOS or CCD type, for example, a CMOS "camera-on-a-chip" or a CCD chip with its associated camera printed circuit boards, although other solid state imaging arrays could also be used. The recording camera 66 may have various configurations, for example, the recording camera 66 may be a monochrome camera or a VGA camera, depending on the desired recorded image or video. A monochrome camera with fast optics may provide a larger field of view at a desired resolution. A VGA camera with a higher pixel count may provide a higher resolution and field of view, although such may effect the bandwidth. The field of view for any camera may also be increased by increasing the size of beam splitter 54.

The recording camera 66 may have an integral automatic gain control (AGC) function or other manual or automatic function controls. The AGC control loop has the purpose of adjusting effective camera gain so the video signal image has optimum intra scene dynamic range at any given time. The AGC loop may be integral to the CMOS camera-on-a-chip.

Depending on the specific type, the recording camera 66 may output digital, video, or both signals. The output signals are output to a memory 65. The memory 65 may be a removable memory, a permanent memory or a combination of both. With a removable memory, the stored images or video may be removed from the camera assembly 60 for storage and review. With a permanent memory, an I/O port may be used to output the stored images or video. In the illustrated embodiment, the I/O port includes a wireless transmitter 67, for example, an RF transmitter or telemetry transmitter, configured to send image or video signals to a remote location. The I/O port may also include hardwire ports (not shown). The transmitter 67 may be configured to provide real-time signals to the remote location to allow users at the remote location to observe the scene observed by the NVG 10 user in real-time.

Referring to FIGS. 3 and 4, system electronics 100 are associated with the image intensifier 20, the infrared camera 40, the video display 46 and the camera assembly 60. The system electronics 100 are also associated with a battery 120 and a controller 80. The battery 80 supplies power to each of the components of NVG 10. Alternatively, the camera assembly 60 may have an independent power supply. The controller 80 is configured to control the image intensifier 20 and the infrared camera 40 and may also be configured to control the camera assembly 60. Alternatively, the camera assembly 60 may have an independent control assembly.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A night vision device comprising:
    a first detector configured to detect and transmit a scene image in a first spectral band along an image intensified input path;
    a second detector configured to detect and transmit the scene image in a second spectral band along an infrared input path;
    a beam splitter configured to receive the image intensified input path image; to output, along a visual lens output path, a first portion of the image intensified input path image, and to output, along a camera output path, a second portion of the image intensified input path image;
    wherein the beam splitter is configured to receive the infrared input image; to output, along the visual lens output path, a first portion of the infrared input path image; and to output, along the camera output path, a second portion of the infrared input image;
    a user optical output configured to receive and output images traveling along the visual lens output path including the first portion of the image intensified input path image and the first portion of the infrared input path image; and
    a camera configured to receive and store images traveling along the camera output path including the second portion of the image intensified input path image and the second portion of the infrared input path image.

2. The night vision device of claim 1 wherein the first detector is an image intensifier.

3. The night vision device of claim 1 wherein the beam splitter comprises a dichroic surface configured to allow the first portion of the image intensified input path image to pass therethrough toward the visual lens output path and to reflect the second portion of the image intensified input path image toward the camera output path.

4. The night vision device of claim 1 wherein the camera is configured to store at least one of still images and video.

5. The night vision device of claim 1 wherein the camera comprises a removable memory.

6. The night vision device of claim 1 wherein the camera comprises a wireless output configured to transmit data to a remote location.

7. The night vision device of claim 1 wherein the camera is removably connected to the night vision device.

8. The night vision device of claim 1 wherein the first detector is an image intensifier and the second detector is an infrared camera.

9. The night vision device of claim 1 wherein the beam splitter comprises a dichroic surface configured to allow the first portion of the image intensified input path image to pass therethrough toward the visual lens output path; to reflect the second portion of the image intensified path image toward the camera output path; to reflect the first portion of the infrared input path image toward the visual lens output path; and to allow the second portion of the infrared input path image to pass therethrough toward the camera output path.

10. The night vision device of claim 9 wherein the first portion of the image intensified input path image is approximately x percent of a brightness of the image and the second portion of the image intensified input path image is approximately (100-x) percent of the image brightness; and the first portion of the infrared input path image is approximately (100-x) percent of the image brightness and the second portion of the infrared input path image is approximately x percent of the image brightness.

11. The night vision device of claim 10 wherein the camera comprises a filter configured to absorb a portion of the second portion of the camera output path image to provide a balanced image to the camera.

12. The night vision device of claim 10 wherein the camera comprises a band pass filter configured to eliminate the second portion of the camera output path image such that the camera receives only the second portion of the camera output path image.

13. The night vision device of claim 10 wherein the camera comprises a filter selectable between a first configuration in which a portion of the second portion of the camera output path image is absorbed to provide a balanced image to the camera and a second configuration in which the second portion of the camera output path image is eliminated such that the camera receives only the second portion of the image intensified input image.

14. A night vision device comprising:
    a housing;
    a first optical receiver located within the housing, wherein the first optical receiver receives a scene image and transmits a first optical signal of the scene image;
    a second optical receiver located within the housing, wherein the second optical receiver receives substantially the same scene image and transmits a second optical signal of the scene image;
    a signal combiner located within the housing, wherein the signal combiner combines the first optical signal and the second optical signal to form a first combined optical signal and a second combined optical signal;

an optical display optically aligned with the first combined optical signal to display the first combined optical signal to a user; and a camera optically aligned with the second combined optical signal, such that the camera records the second combined optical signal.

15. The night vision device of claim 14, wherein the camera is releasably mounted to the housing.

* * * * *